March 14, 1950     C. B. IVES     2,500,357

VALVE DEVICE

Filed March 22, 1945     2 Sheets-Sheet 1

INVENTOR:
CLIFFORD B. IVES,
ATTORNEYS.

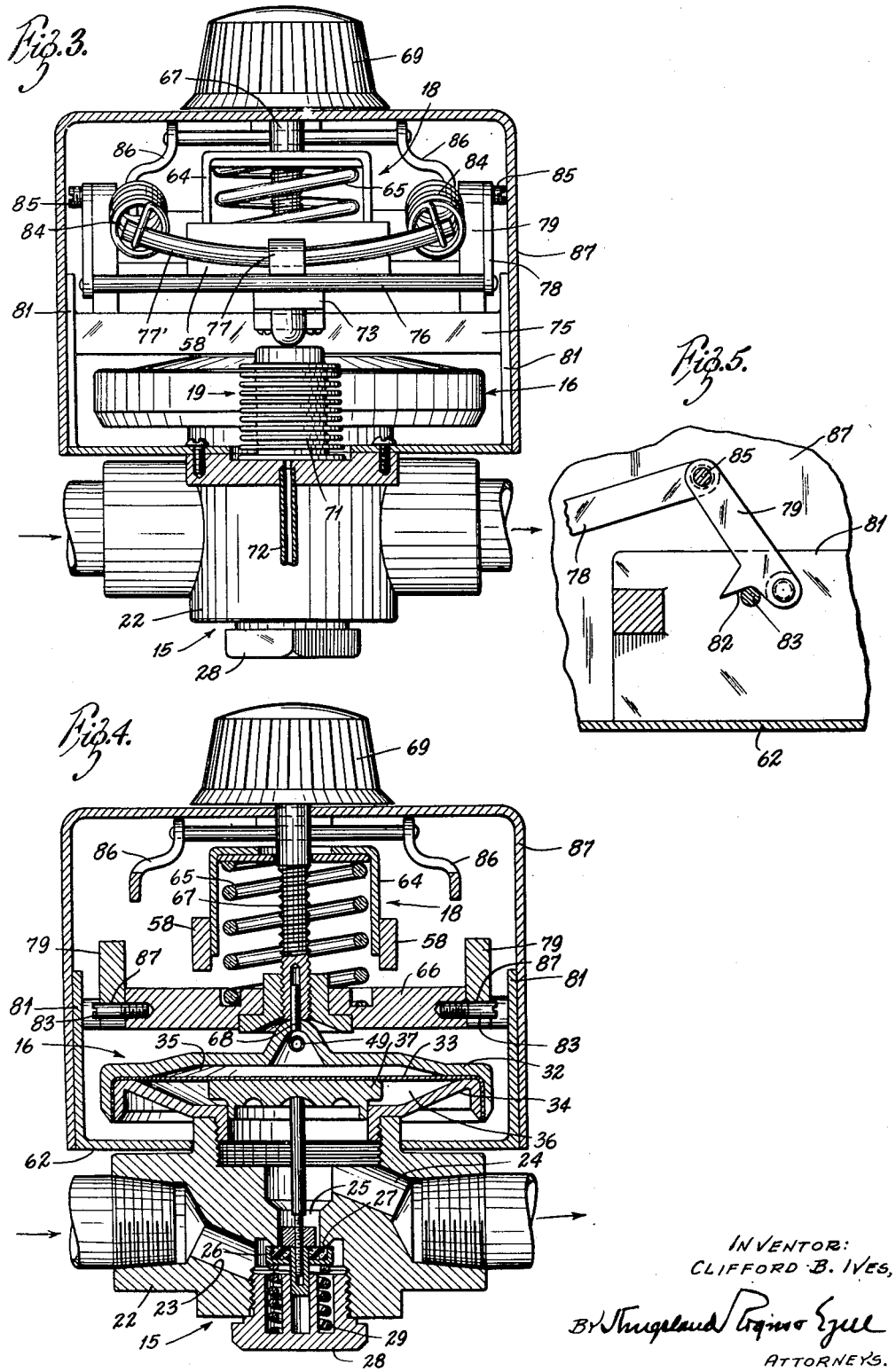

Patented Mar. 14, 1950

2,500,357

UNITED STATES PATENT OFFICE 2,500,357

VALVE DEVICE

Clifford B. Ives, Tenafly, N. J., assignor to Alco Valve Company, University City, Mo., a corporation of Missouri Application March 22, 1945, Serial No. 584,080

18 Claims. (Cl. 236—80)

1

This invention relates to valve devices generally, and concerns itself more particularly with regulators capable of effecting a regulation which is a function of a predetermined force and a measured temperature.

One of the primary objects of the invention is to provide a regulator for maintaining process temperatures and operating pressures in a predetermined ratio over a given range, which is adjustable over said range by a single operation and in which the predetermined ratio is automatically maintained.

It is also an object of the invention to provide a pressure-operated valve of the type described in which the operating medium discharges to the downstream side of the valve to prevent waste thereof.

It is a further object of the invention to provide a regulator possessing the features set forth in the foregoing objects in which all of the control mechanisms are contained in a compact unit.

Yet another object of the invention is to provide a regulator in which the working parts thereof are arranged to operate with a minimum amount of friction and lost motion, overcoming a disadvantage inherent in the ordinary types of mechanisms employed in prior art devices.

Still another object of the invention is to provide a regulator for maintaining an operating pressure which is a function of a predetermined variable force and a force which is a function of a temperature measurement. Moreover, it is intended to provide said device with means to vary the predetermined force over a given range and to simultaneously and automatically vary the effectiveness of the force which is a function of the measured temperature in a manner such that the two forces are maintained in a fixed ratio over the given range.

A more specific object of the invention is to provide a valve device with a pressure-operated power means for its control and, in turn, to control the power means by a pilot valve functioning in accordance with a predetermined force and a force which is a function of a predetermined temperature.

Other objects and advantages will become apparent as the description proceeds, and a more comprehensive understanding of the invention will be afforded from the following detailed description when considered in conjunction with the accompanying drawings in which like reference numerals have been used throughout to designate like parts, and in which:

2

Fig. 3 is an end section taken along the line 3—3 of Fig. 1 and showing the arrangement of the valve body, its pressure-responsive power means, and the arrangement of the parts for applying external forces to the device's pilot valve;

Fig. 4 is a cross-sectional view of the device taken along the line 4—4 of Fig. 1 and showing the arrangement of the valve control apparatus with respect to the main valve; and Fig. 5 is a detailed view taken along the line 5—5 of Fig. 2 showing an arrangement of the linkages providing automatic setting of the device.

Figure 1:
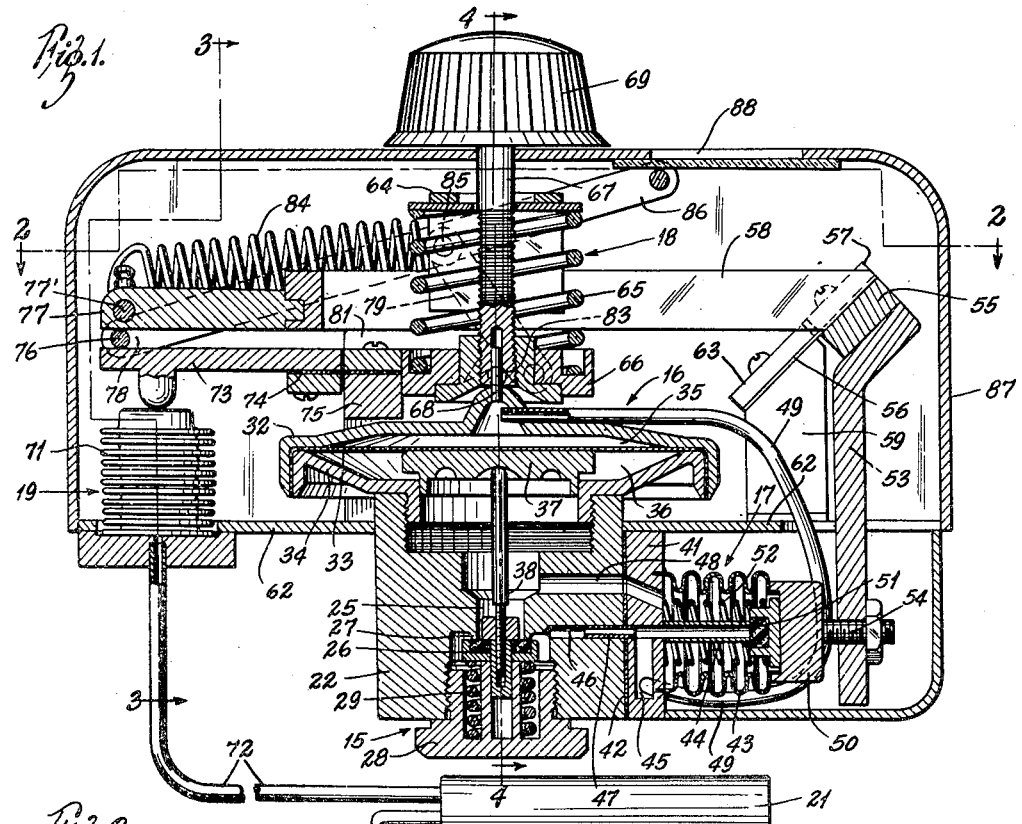
Fig. 1 is a vertical cross section of a valve device embodying the instant invention in a preferred form.
Figure 2:
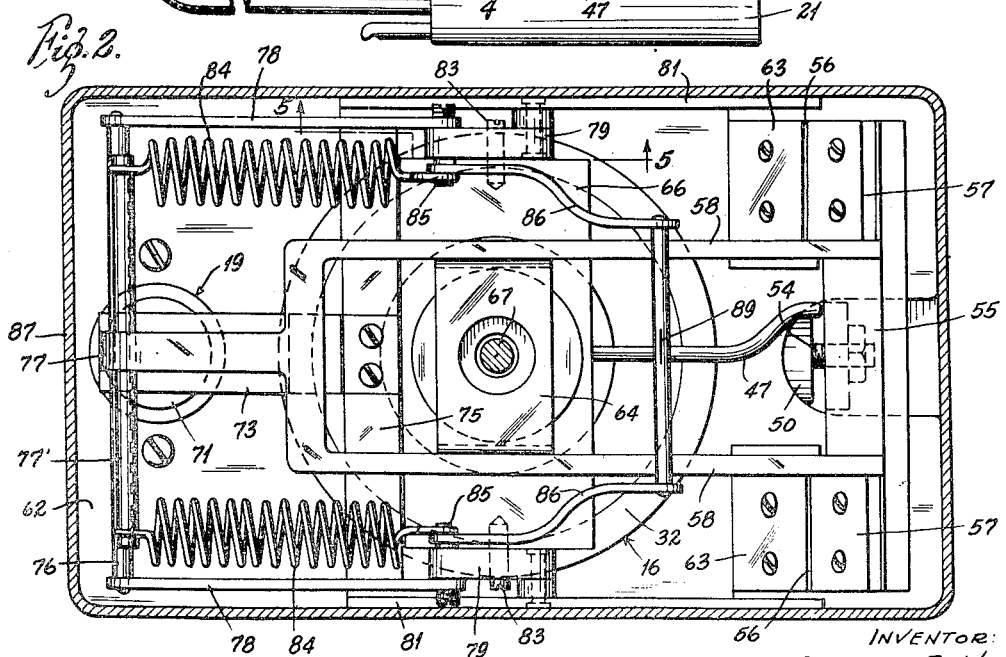
Fig. 2 is a horizontal section taken along the line 2—2 of Fig. 1 and showing the force-applying linkages operable against the device's pilot valve.

In the form illustrated in Fig. 1, the invention comprises a main valve 15 which is operated by a pressure-responsive power element 16. The power element, in turn, is controlled by a pilot valve 17 which functions in accordance with forces applied thereto by an external loading means 18 and a temperature-responsive loading means 19. The latter device develops a force which is applied to the pilot valve 17 and which is a function of a temperature measured at a remote point by the thermal bulb 21. By mechanisms subsequently to be described in detail, the pilot valve device 17 is loaded by a force developed in the loading device 18 which is variable over a given range. It is also loaded with a force developed in the temperature-responsive loading force mechanism 19 as previously described. These two forces, operating against the pilot device, effect a control of the pressure medium operating the power means 16, and, under the influence of the latter element, the main valve 15 is caused to deliver an operating pressure at its downstream side, which is a function of the forces developed in the mechanisms 18 and 19.

As illustrated in Fig. 4, the main valve 15 comprises a valve body 22 which is provided with an inlet opening 23 and an outlet opening 24. These two openings are connected by ports which communicate with a valve cavity, or valve stack, 25. Within the valve stack, a valve disc 26 is movable against its seat 27 to open and close the valve. A plug 28 is screwed into the valve body and forms a retainer for a valve spring 29 which urges the valve disc 26 against its seat 27 to maintain the valve in a normally closed position.

The main valve 15 is opened and closed by the power means 16 which is mounted on top and screwed to the valve body 22. This power means is of the diaphragm type and comprises a diaphragm head 32, a flexible diaphragm 33, and a lower diaphragm saucer 34. The diaphragm head 32 and the saucer 34 retain the flexible diaphragm 33 and are sealed to form two pressure chambers 35 and 36, respectively. Movable with the diaphragm 33 is a buffer plate 37 which bears against a valve stem 38 attached to the valve disc 26. By virtue of the arrangement of the parts as shown, the pressure chamber 36 is communicable with, and open to, the valve stack 25 and operates under a pressure maintained at the downstream side of the valve.

For operating the power means 16, a pressure-exerting medium is supplied to the chamber 35 thereof from the supply side of the main valve 15 and is maintained at a value controlled by the pilot valve 17. The pilot mechanism, which is auxiliary to the main valve, is mounted on the valve body 22. A block 41 is screwed to the valve body and sealed with a gasket 42 to assure a pressure-type closure between the valve body and the block. To this block is soldered a bellows 43 which envelopes a pilot tube 44. The latter element connects with a pressure chamber 45 in the block 41 which, in turn, is open to the supply side of the main valve 15 through a connection 46 and a restricting means, such as a capillary 47. The pressure maintained by the regulator on the downstream side of the main valve 15 is transmitted to the bellows 43 by a port 48 extending through the valve body 22 and the block 41, and the pressure chamber 35 of the power means 16 is connected to the pressure chamber 45 by means of a copper tube 49. Connected to the bellows 43 is a cap or button 50 which is provided with a soft seat face 51 to cover the open end of the pilot tube 44. The button 50 acts as a spring guide for a pilot valve spring 52 and also serves as a buffer plate for the bellows 43.

Control of the pilot device 17 is effected by the combined forces developed in the loading device 18 and the temperature-responsive loading device 19. These forces are applied to the cap 50 which serves as a buffer plate for the bellows 43 by means of a pivoted arm 53 which carries an adjustable screw 54 connecting with the button 50. The pivoted arm 53 is attached to a cross member 55 which rocks about a pair of leaf fulcrums 56 to which it is attached by the cap plates 57 forming parts of the bifurcated segments of a yoke 58. The fulcrum leaves 56 are rigidly mounted to a pair of fulcrum blocks 59 supported on a base plate 62. This plate is fixed to the main valve body 22 and forms a support for the entire control mechanism of the valve. The fixed ends of the leaf springs 56 are attached to the fulcrum blocks 59 by plates 63. Under this arrangement of parts, the arm 53 is movable about a fulcrum point appearing at the free ends of the fulcrum springs 56 under forces exerted by the yoke 58.

For applying a variable predetermined force to this yoke, the loading mechanism 18 is provided, with its parts arranged as follows.

To the yoke 58 is connected a strap 64 with locating means for positioning a loading spring 65 on top of which this positioning element bears. The lower end of the spring 65 rests in a recess provided in a movable button 66 which is raised or lowered by turning an adjusting stem 67. For supporting the adjusting stem 67, a guide stem 68 is fastened to the top of the diaphragm head 32. The adjusting stem 67 is rotated by means of a suitable knob 69 and is free to turn about the guiding stem 68 to cause the vertical movement of the button 66 for increasing the tension of the spring 65. The force of this spring is then transmitted through the strap 64 to the yoke 58 causing the same to move about its fulcrum and applying the predetermined force represented by the tension of the spring to the pressure bellows 43 through the pressure-actuating arm 53.

In order to superimpose a force which is a function of a measured temperature upon that developed in the loading device 18, the mechanism 19 and its associated elements are provided. The desired force is developed in a bellows 71 which is attached to the base plate 62 and connected with the thermal bulb 21 by means of a capillary tube 72. The force developed in the bellows 71 is transmitted to a lever arm 73 which is free to move about a leaf spring fulcrum formed by the spring 74 and the fulcrum block 75 also carried on the base plate 62. A movable fulcrum 76 is arranged to move on top of the lever 73 between it and an extension 77 of the yoke 58, and the position of this fulcrum along the lever 73 controls the magnitude of the effective force produced in the bellows 71.

Since the operating pressure at the downstream side of the main valve 15 is to be maintained at a constant ratio with a process temperature recorded by the thermal bulb 21 and, further, since the force generated in the bellows 71 is a function of that temperature, it is desirable to provide means for varying the magnitude of the forces developed in the loading devices 18 and 19 over a given range in a manner such that this ratio is maintained constant. To effect a variable loading force of a predetermined value, the loading means 18 is provided, and the force developed is varied by means previously described. On the other hand, the effectiveness of the force developed in the bellows 71 is varied in a predetermined ratio with a force developed in the mechanism 18 by a system of linkages, connecting these two control elements, which is operable to move the fulcrum 76 along the lever 73. As a part of this system, a pair of arms 78 is attached to the movable fulcrum which, in turn, is connected to a pair of cam levers 79. These cam levers are pivoted to an upright support 81 resting on the base plate 62 and have a cam surface extension 82 which is in contact with a pin 83 attached to the adjusting button 66. A pair of springs 84 is attached to the respective pivots of the cam levers 79 at points 85 and to a tie rod 77' supported in the extension 77 of the yoke 58. These springs maintain the arms 78 and the cam levers 79 in a position such that the cam surfaces 82 of the latter elements are continuously in engagement with their respective pins 83. Also connected to the pivots of the cam lever 79 at the points 85 is a bail 86 which is movable with the arms 78 when a setting of the controls is made by rotation of the adjusting knob 69.

With the arrangement of the parts just described, it is seen that, as the adjusting knob 69 is rotated and, incidental thereto, the stem 67, the spring button 66 will be caused to rise, and the cam lever 79 will be rotated in a clockwise direction (Fig. 1) moving the fulcrum 76 from left to right. A reverse rotation of the adjusting knob 69 will lower the spring button 66 and cause a counterclockwise movement of the cam lever 79 under the forces exerted by the springs 84 and a movement of the fulcrum 76 from right to left. The degree of motion or movement of the fulcrum 76 is controlled by the contour of the cam surface 82 of the lever 79. This motion may also be controlled by varying the initial starting angle of the levers.

The entire regulator device is enclosed as a compact unit in a housing 87. A window 88, convenient to the adjusting knob 69, is open in the housing 87 to permit the observation of the bail 86. An indicating marker 89 carried on the bail 86 may be aligned with a graduated scale positioned on the opaque cover of the window to give an indication of the setting of the adjusting apparatus of the regulator. This scale may be graduated in pounds per square inch, and a legend may be supplied for use therewith which will indicate the ratio of forces produced by the loading devices 18 and 19 as determined by the cam surface of the lever 79 particular to the individual device.

Operation

When installed in a system, the pressure supply main is connected to the inlet opening 23 and the part of the system in which the regulated pressure is to be maintained to the outlet, or downstream side, 24. It is presupposed that a valve has been chosen in which the critical parts have been selected to maintain the desired ratio of process temperature to operating pressure. The adjusting knob 69 of the valve is then turned until a selected pressure is indicated, for example, a pressure of fifty pounds per square inch. Assuming that the thermal bulb 21 is set for a process temperature of 40° F., then the forces exerted in the loading device 18 will be transmitted through the yoke 58 and the pressure-actuating arm 53 to the bellows 43. This force will cause the cap 50 to close the pilot tube 44 and hold the same in this position until a pressure approximating fifty pounds per square inch is reached on the downstream side of the main valve 15. When the cap 50 closes the pilot tube 44, a pressure equivalent to the supply pressure will gradually build up in the chamber 45 and will be transmitted by the tube 49 to act on the top of the diaphragm 33. This pressure will exert a downward force on the stem 38, the valve will open, and an increase in pressure on the downstream side of the valve will result. As the pressure at this point approaches the desired fifty pounds per square inch, it acts within the bellows 43 moving it in a direction such as to rotate the pressure arm 53 in a counterclockwise direction about the leaf spring 56. This movement moves the cap 50 and opens the pilot tube 44 allowing the cap 50 and its seat 51 to throttle the pilot valve. This action is continued until the desired pressure of fifty pounds per square inch is maintained on the downstream side of the main valve 15.

Should there be an increase in temperature at the thermal bulb 21, the pressure acting in bellows 71 will be increased and a force will be transmitted through the yoke 58 and the pressure arm 53 which will close the pilot tube 44. Thereupon, pressure will increase in the pressure chamber 45 and, in turn, in the pressure chamber 35 of the power element 16, and the main valve 15 will open. This action will continue until a pressure increase on the downstream side of the valve is effected to a degree necessary to overcome the temperature increase. Conversely, if a temperature drop is recorded at the thermal bulb 21, pressure in the bellows 71 will drop. This will permit the forces exerted in the bellows 43 to move the pressure arm 53 and the yoke 58 in a counterclockwise direction and open the pilot tube 44 to the pressure appearing on the downstream side of the valve. The pressure within chamber 45 will then discharge to the downstream side of the valve, a pressure drop in the chamber 35 will result, and the main valve 15 will close. This condition will exist until a lower pressure demanded by the pressure drop has been reached.

While a preferred embodiment of the invention has been shown and described, it is apparent that widely varying changes and modifications could be made therein without departing from the spirit or scope of the invention. Insofar as such changes and modifications are covered by the appended claims, they are included as if described.

What is claimed is:

1. In combination with a valve having a pressure-responsive power means for operating the same, apparatus for controlling said power means comprising a pilot tube, a pressure chamber connected to the upstream side of said valve through a restricting orifice, the pilot tube and pressure chamber being connected together, a sealed bellows enveloping said tube and having a cap attached thereto and movable to close said tube, means connecting the inside of the bellows with the downstream side of said valve, means connecting said pressure chamber with said power means, a loading device including an adjustable force means and connection between the force means and the bellows for placing a predetermined force on said bellows, a temperature-responsive means connected with said loading device to apply an additional force on said bellows as a function of temperature, and single adjusting means connected with the loading device for simultaneously varying the magnitudes of the forces developed by said loading device and said temperature-responsive means, whereby a pressure, selectable over a given range, will be maintained on the downstream side of said valve which is a function of said predetermined force and said temperature.

2. Apparatus as claimed in claim 1 including an indicator for showing the setting of said magnitude varying means.

3. In combination with a valve having a control means therefor which is responsive to applied forces, apparatus for loading said control means comprising a movable arm, a yoke attached thereto and movable therewith about a fulcrum, a pivoted lever mounted in parallelism with a free end of said yoke, a pressure-operated power means responsive to remote temperatures and operative against said lever, a fulcrum interposed between said lever and said yoke and movable therebetween to vary the effective force of said power means acting through said yoke and arm against said control means, a spring means acting against said yoke to apply a predetermined force on said control means, a tensioning device for varying the force of said spring, and means interconnected with said tensioning device and said movable fulcrum for simultaneously adjusting the force of the tensioning device and the position of the fulcrum whereby the effective forces of said power means and said spring may be varied over a given range simultaneously.

4. In combination with a valve having a control means therefor which is responsive to applied forces, apparatus for loading said control means comprising a movable arm, a yoke attached thereto and movable therewith about a fulcrum, a pivoted lever mounted in parallelism with a free end of said yoke, a pressure-operated power means responsive to remotely measured temperatures and operative against said lever, a fulcrum interposed between said lever and said yoke and movable therebetween to vary the effective force of said power means acting through said yoke and arm against said control means, a spring means acting against said yoke to apply a predetermined force on said control means, a tensioning device for varying the force of said spring, means interconnected with said tensioning device and said movable fulcrum for simultaneously adjusting the force of the tensioning device and the position of the fulcrum whereby the effective forces of said power means and said spring may be varied over a given range simultaneously, and means for indicating the setting of said adjusting device.

5. In combination with a valve, a pressure-responsive control means therefor comprising a movable diaphragm, a first and a second pressure chamber arranged on opposite sides of said diaphragm, means associated with said diaphragm for operating the valve, a third pressure chamber auxiliary to said valve and communicating with the upstream side thereof through a restricted orifice, means connecting said first and third pressure chambers, a pilot tube connecting with the third pressure chamber, a bellows enveloping said tube and having attached thereto and movable therewith a cap for closing an open end of said tube, means connecting the inside of said bellows with the downstream side of said valve, means associated with said bellows for receiving an external force, a loading means for applying a predetermined force to said receiving means, a temperature-responsive device for applying a force to said receiving means which is a function of a measured temperature, and means interconnected with the receiving means operable to vary separately but simultaneously the effective forces of said loading and temperature-responsive means applied through the receiving means to the bellows.

6. Apparatus as claimed in claim 5 including means for indicating the setting of said effective force varying means.

7. In a mechanism of the kind described, a valve, differential pressure-responsive means for operating the valve, one side of the pressure-responsive means being subject to pressure at the downstream side of the valve, and means applying force to the opposite side of the valve including a yieldable force means, and a temperature-responsive force means, means to apply the forces of said yieldable force means and the temperature-responsive force means to the valve, means to adjust the effective force on the valve of one of said force means, and means interoperated with said first adjusting means to adjust the effective force of the other force means when the first is adjusted.

8. In a mechanism of the kind described, a device actuatable by force, a temperature-responsive force producing means, a yieldable force producing means, means for applying the forces of each to the device, for controlling actuation thereof, means to adjust one of said force producing means, means to adjust the effective force of the other force producing means, and mechanism connecting said adjusting means for operation of one when the other is operated.

9. Mechanism for controlling pressure in a fluid line including a valve, means to actuate the valve to maintain desired pressure conditions in the line, comprising temperature-responsive force means, yieldable force means, means applying the force of the yieldable force means to the valve to control operation thereof, means applying the force of the temperature - responsive means to the valve to modify the force of the yieldable force means in predetermined increments per unit of temperature change, means to vary the force of the yieldable force means, and means simultaneously interconnected with the varying means to adjust the increment of force produced by the temperature-responsive means per unit of temperature change.

10. Mechanism for providing predetermined pressure conditions in a fluid line, including means to maintain a certain base fluid pressure in the line, temperature-responsive means to modify said base pressure in determined increments per degree of temperature change, means to vary the base pressure, and means interoperated with the varying means to adjust the increments of base pressure modification per degree of temperature change when the varying means is operated.

11. In a mechanism of the kind described, a force-responsive actuated device, a first yieldable force means, a second force means, means receiving the force of said two force means to apply the resultant of both force means to the actuated device, means for adjusting the force of one force means, the receiving means including a lever and a fulcrum acted upon by the other force means, means for adjusting the leverage of said other force means, and mechanism interconnecting said two adjusting means to operate one when the other is operated.

12. In a mechanism of the kind described, a force-responsive actuated device, a lever, spring force means biasing the lever against the actuated device, a second force means, an adjustable connection between the second force means and the lever to adjust the leverage of the second force means, means for adjusting the force of the spring force means, and means operated by said adjusting means for adjusting the connection of the second force means with the lever.

13. In a mechanism of the kind described, a force-responsive actuated device, a lever, spring force means biasing the lever against the actuated device, a second force means, an adjustable connection between the second force means and the lever to adjust the leverage of the second force means, means for adjusting the force of the spring force means, means operated by said adjusting means for adjusting the connection of the second force means with the lever, said actuated device comprising a valve in a fluid pressure line, and means to apply force to the valve in opposition to that applied by the lever, said force applying means being responsive to fluid pressure derived from the fluid line.

14. In a mechanism of the kind described, a force-responsive actuated device, a lever, spring force means biasing the lever against the actuated device, a second force means, an adjustable connection between the second force means and the lever to adjust the leverage of the second force means, means for adjusting the force of the spring force means, means operated by said adjusting means for adjusting the connection of the second force means with the lever, said actuated device comprising a pilot valve connected with a fluid line, a main valve in the fluid line operated by the pilot valve, means applying a force to the pilot valve in opposition to that from the lever, that is a function of pressure on the downstream side of the main valve, whereby the pilot valve will be positioned as a function of downstream pressure less the pressure produced by the lever, and means positioning the main valve as a function of the position of the pilot valve.

15. A pressure control mechanism including a device to be actuated by force, a lever connected with the device, a yieldable force means acting on the lever, a second force means, a movable connection between the second force means and the lever to apply the force of the second force means to the lever and through the lever to the device with varying effect upon the device dependent upon the position of the connection, the movable connection having means selectively adjustable to a plurality of positions between extreme limits, means including a displaceable element for adjusting the force of the yieldable force means, and means connecting the displaceable element of the adjusting means and the selectively adjustable means of the movable connection of the second force means.

16. A pressure control mechanism including a device to be actuated by force, a lever connected with the device, a yieldable force means acting on the lever, a second force means, a movable connection to apply the force of the second force means to the lever, means including a displaceable element for adjusting the force of the yieldable force means, link means extending from the movable connection of the second force means, and a cam device between the displaceable element and the link means to displace the link upon adjustment of the displaceable element, thereby to adjust also the connection between the second force means and the lever.

17. A pressure control mechanism including a device to be actuated by force, a lever connected with the device, a yieldable force means acting on the lever, a second force means, a movable connection to apply the force of the second force means to the lever including a selectively adjustable means adjustable to a plurality of positions between extreme limits, means including a displaceable element for adjusting the force of the yieldable force means, means connecting the displaceable element of the adjusting means and the selectively adjustable means of the movable connection of the second force means, said movable connection comprising a second lever acted upon by the second force means, and a movable fulcrum between the second and first levers.

18. A valve mechanism including a valve housing having an inlet and an outlet, a main valve reciprocable in the housing, a movable wall over the main valve, open at one side to the outlet side of the main valve, cover means providing a main pressure chamber on the other side of the movable wall, a connection between the inlet side of the main valve and the pressure chamber, whereby the main valve may be operated when pressure in the pressure chamber exceeds outlet pressure, a pilot valve mechanism on the side of the housing including a pilot pressure chamber connected to the outlet of the main valve, having a movable pilot wall and a pilot valve operated thereby, the pilot valve controlling flow from the main pressure chamber to the pilot pressure chamber, force mechanism to apply force to the movable pilot wall, including a bell crank type of lever having a first arm extending along the side of the housing and connected to the movable pilot wall, having a second arm extending across the cover means of the main pressure chamber, and pivot means at the junction of the arms pivoting the lever to the housing, a spring engaging the second end of the lever, a temperature-responsive power member adjacent the second end of the lever to the side of the housing opposite the pivot, a movable connection between said power member and the lever, an abutment member for the spring, an adjustable element opposite the cover for adjusting the abutment member to vary the spring force on the lever, an adjustable connection between the adjustable element and the movable connection of the temperature-responsive member for effecting adjustment of the latter when the spring force is adjusted.

CLIFFORD B. IVES.

REFERENCES CITED

The following references are of record in the file of this patent:

UNITED STATES PATENTS

| Number | Name | Date |
|---|---|---|
| Re. 3,727 | Naylor | Nov. 9, 1869 |
| Re. 18,483 | Manson | May 31, 1932 |
| 249,088 | Pope | Nov. 1, 1881 |
| 905,187 | Hulse | Dec. 1, 1908 |
| 1,098,616 | Creveling | June 2, 1914 |
| 1,392,534 | Snell | Oct. 4, 1921 |
| 1,544,194 | Stewart | June 30, 1925 |
| 1,881,798 | Mason | Oct. 11, 1932 |
| 1,971,801 | Wantz | Aug. 28, 1934 |
| 2,029,203 | Soderberg | Jan. 28, 1936 |
| 2,040,109 | Spence | May 12, 1936 |
| 2,102,007 | Kimball | Dec. 14, 1937 |
| 2,185,578 | Beardsley | Jan. 2, 1940 |
| 2,190,506 | Wurr | Feb. 13, 1940 |
| 2,231,696 | Wolfe | Feb. 11, 1941 |
| 2,312,201 | Thompson | Feb. 23, 1943 |
| 2,376,525 | Taylor | May 22, 1945 |
| 2,401,144 | Dube | May 28, 1946 |
| 2,408,685 | Rosenberger | Oct. 1, 1946 |